July 9, 1929.  C. V. VANDE CARR ET AL  1,720,022
TOOL FOR SAWING BUSHINGS AND THE LIKE
Filed Feb. 15, 1928
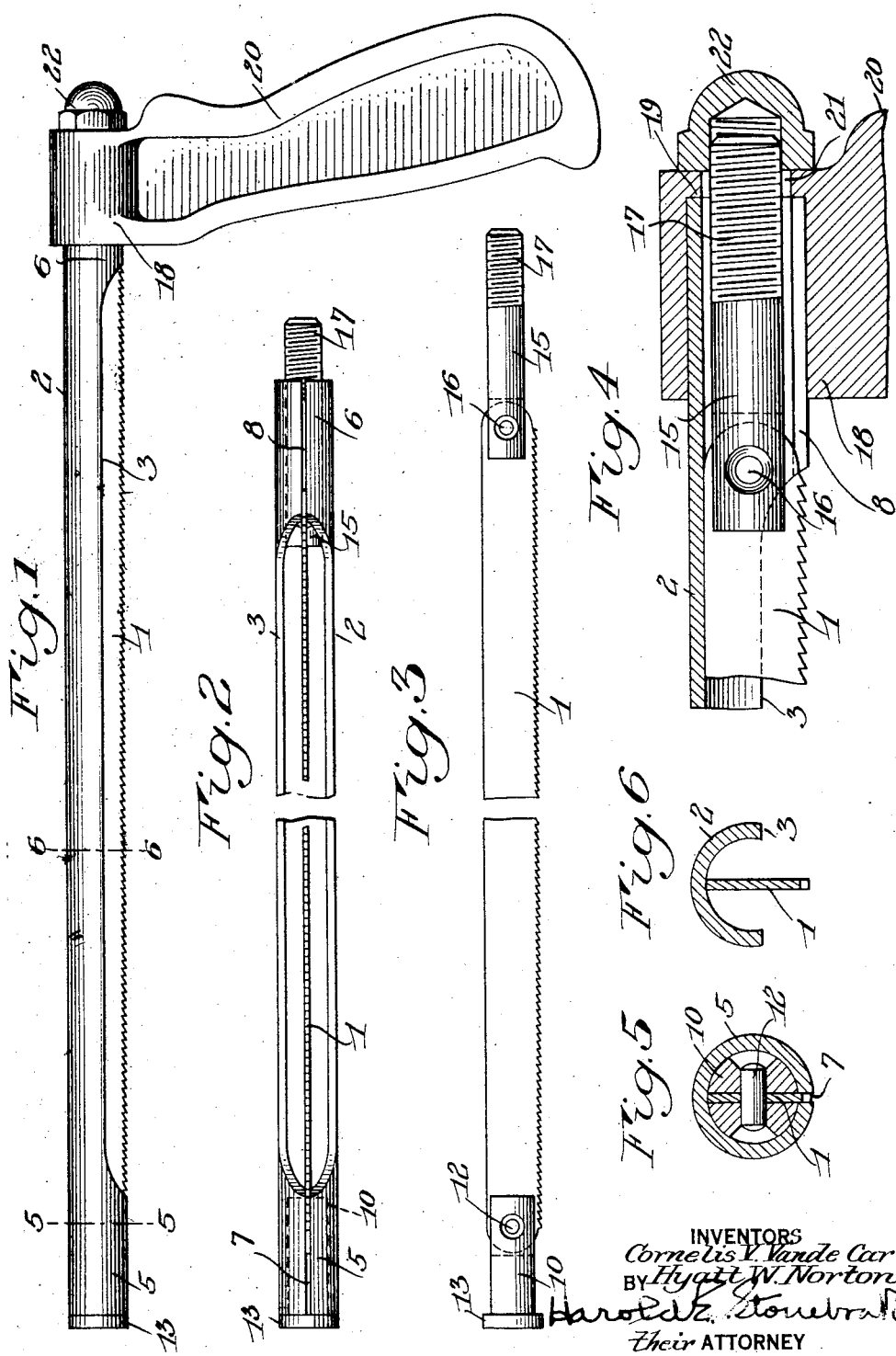
INVENTORS
Cornelis V. Vande Carr
Hyatt W. Norton
BY Harold E. Stonebraker
Their ATTORNEY Patented July 9, 1929.

1,720,022

UNITED STATES PATENT OFFICE.

CORNELIS V. VANDE CARR AND HYATT W. NORTON, OF ROCHESTER, NEW YORK, SAID VANDE CARR, ASSIGNOR TO SAID NORTON.

TOOL FOR SAWING BUSHINGS AND THE LIKE.

Application filed February 15, 1928. Serial No. 254,478.

This invention relates to a tool embodying a saw blade and has for its purpose to provide a practicable and efficient device for sawing bushings while in place, sawing conductor cables, and for other uses under conditions giving only limited space and preventing utilizing the usual hack saw.

More particularly, the invention has for its principal object to afford an economical and simple structure for housing and mounting a removable saw blade in such a way as to protect the blade against accidental injury or breakage, or wear other than that incidental to its normal use.

Another purpose of the invention is to so support a saw blade as to permit its ready insertion through quite a small opening or in a limited space without danger of injuring the blade.

Still a further object is to afford a structure of few parts that permits ready removal and replacement of a saw blade when worn, and also lends itself to an extremely easy and quick tightening of the saw blade and handle, while also permitting angular adjustment of the handle with reference to the saw blade.

To these ends, the invention comprehends the structure that will appear clearly from the following description when read in conjunction with the accompanying drawings, the novel features being pointed out in the claims following the description.

In the drawings:

Figure 1 is a side elevation of a tool made in accord with a preferred embodiment of the invention;

Figure 2 is a bottom plan view partially broken away of the saw blade and housing with the handle portion removed;

Figure 3 is a side elevation, broken away at the center, of the saw blade and its retaining members;

Figure 4 is an enlarged vertical sectional view taken centrally of Figure 1 through the handle portion of the tool, with parts broken away;

Figure 5 is a sectional view on line 5—5 of Figure 1, and

Figure 6 is a sectional view on line 6—6 of Figure 1.

Referring more particularly to the drawings, which are intended merely to exemplify one of various practical adaptations of the invention, 1 designates a saw blade arranged to be mounted in a hollow housing 2 which is preferably tubular, although it may be of some other suitable form. The housing 2 is cut away along one side, as designated at 3, the depth of such cut-away portion being approximately half the diameter of the housing 2, and permitting operating access to the saw blade 1, the rear edge of which preferably rests against the inner surface of the housing, as shown in Figure 4. The housing also includes tubular end portions 5 and 6 provided with the slots 7 and 8 which are in line with the longitudinal center of the cutaway portion 3 and adapted to receive the ends of the saw blade 1.

The saw blade is held in place within the tubular housing and properly tightened by means that will now be described, including a cylindrical retaining member 10 engageable within the housing at one end and slotted to embrace the adjacent end of the saw blade 1, the member 10 being held to the saw blade 1 by a removable pin 12. 13 designates a head on the outer end of the member 10, abutting against the adjacent end of the housing when the parts are assembled, as shown in Figures 1 and 2, and acting to limit endwise movement of the retaining member 10 and thus fix such end of the saw blade against endwise movement. The saw blade is held in place and tightened by means located at the opposite end of the tubular housing, as will now be described.

15 designates a cylindrical retaining member that is slotted to embrace the adjacent end of the saw blade 1 to which it is held by a removable pin 16, while 17 designates a threaded extremity on the retaining member 15. The cylindrical end 6 of the housing is positionable within a cylindrical socket in a handle portion 18. The end of the housing abuts a shoulder 19 formed in the handle portion, and the latter includes a handle 20 for holding and operating the tool. 21 designates an opening formed in the handle portion 18 and constituting a continuation of the opening in the tubular housing 2. The threaded extremity 17 of the retaining member 15 extends through said opening 21, as shown in Figure 4, and the parts are assembled in operative relationship by turning the nut 22, abutting the outer surface of the handle portion 18. Such turning of the nut 22 on the threaded member 15 draws the latter and with it the saw blade endwise of the housing so as to tighten the saw blade and at the same time securely clamps the handle and handle portion between the tubular housing 2 and nut 22.

When the saw blade 1 becomes worn sufficiently to require renewal, the parts are quickly disassembled by loosening the nut 22 which permits the retaining members and saw blade to be withdrawn through the opposite end of the housing 2. The retaining members are removed from the saw blade by taking out the pins 12 and 16. After attaching the members 10 and 15 to a fresh saw blade, the parts are inserted through the outer end of the tubular housing 2 until head 13 abuts such end of the housing, as shown in Figure 2. The parts thus assembled are inserted within the socket of the handle portion and the saw is tightened and the final operative relationship established by tightening the nut 22.

In using the tool, its cylindrical form with the saw blade arranged within the housing permits it to be inserted through an opening of minimum size or otherwise used in the smallest possible space, the closed side of the housing serving to protect the saw blade as it is inserted for use. It will be obvious also that when desirable, because of conditions of operation, to change the angle of the handle 20 with reference to the saw blade, this can quickly be accomplished by loosening the nut 22 and swinging the handle around to any desired position with relation to the cutting edge of the saw blade 1, making it practicable and simple to saw a bushing or other part either in inverted position or at any desired angle.

Various modifications in the structure shown may be made without departing from the underlying principles of the invention, and this application is intended to cover any changes or adaptations coming within the purposes set forth or comprehended by the following claims.

We claim:

1. The combination with a hollow cylindrical housing cut away along one side, of a saw blade arranged with its cutting edge extending centrally of said cut-away portion and approximately coincident with the periphery of the housing, and retaining means for tightening the blade.

2. The combination with an integral housing, of a saw blade located therewithin with its rear edge abutting the bottom of the housing and its sides embraced by opposite portions of the housing, the housing being partially cut away between its ends to expose the cutting edge of the saw blade, means for fixedly holding the saw blade at one end of the housing, a handle extending away from the opposite end of the housing at a sharp angle thereto and adjustable in a plane transversely of the saw blade, and clamping means cooperating with the saw blade and handle and acting to hold the handle and housing in adjusted relation.

3. The combination with an integral housing, of a safe blade located therewith with its rear edge abutting the bottom of the housing and its sides embraced by opposite portions of the housing, the latter being cut away between its ends to expose the cutting edge of the saw blade, means for fixedly holding the saw blade at one end of the housing, a handle extending away from the opposite end of the housing at a sharp angle thereto and having a cylindrical socket, the housing including a cylindrical portion fitting said socket and rotatable therein whereby the handle can be adjusted in a plane transversely of the saw blade, a shoulder in the handle socket against which said cylindrical portion abuts, and clamping means cooperating with the handle and saw blade and acting to draw the housing against said shoulder and to clamp together the saw blade, housing and handle.

In witness whereof, we have hereunto signed our names.

CORNELIS V. VANDE CARR.
HYATT W. NORTON.